Oct. 1, 1935.　　　　J. T. NEEDHAM　　　　2,015,958
PNEUMATIC DISPATCH TUBE APPARATUS
Filed Oct. 1, 1930
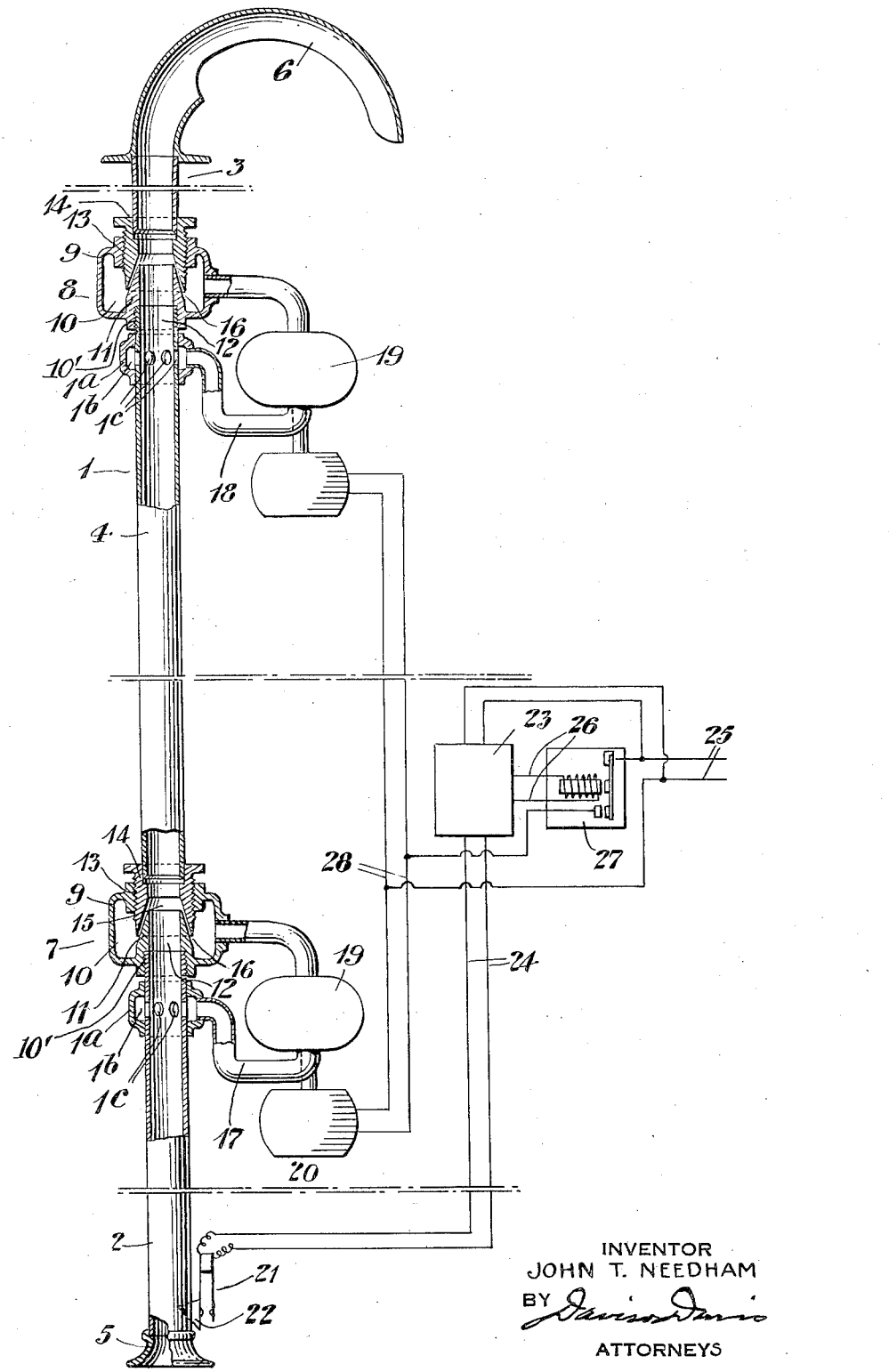
INVENTOR
JOHN T. NEEDHAM
BY
ATTORNEYS Patented Oct. 1, 1935

2,015,958

UNITED STATES PATENT OFFICE 2,015,958

PNEUMATIC DISPATCH TUBE APPARATUS

John T. Needham, North Plainfield, N. J., assignor to General Conveyors Limited, Montreal, Quebec, Canada, a corporation of Canada Application October 1, 1930, Serial No. 485,646

6 Claims. (Cl. 243—9)

Important objects of the present invention are, to provide improved efficient means for causing a flow of air through a pneumatic dispatch tube to propel the carriers therealong; to provide a dispatch tube apparatus wherein a carrier-propelling flow of air through a dispatch tube is satisfactorily produced by withdrawing air from the tube at an intermediate point in the length of the tube line, compressing the withdrawn air, and injecting it back into the tube at a point farther advanced toward the discharge terminal; to provide for a plurality of said air withdrawals and injections at longitudinally spaced points along the tube to boost the carrier propulsion; and to accomplish other objects which will appear hereinafter.

In the drawing, the figure is an elevation of the dispatch tube apparatus, partly in section.

The apparatus includes a dispatch tube line 1, in the present instance comprising two end tube sections 2 and 3, and an intermediate tube section 4. The outer end of tube section 2 has a bell mouth 5 and forms a sending terminal through which the carriers are inserted. The outer end of section 3 is curved and forms the discharge terminal and is provided with an arcuate shield 6 for guiding the discharged carriers. While in the present instance the terminals are formed by the open tube ends, terminal heads or devices of any suitable form may be employed. An injector device 7 connects together the tube sections 2 and 4 and a similar injector device 8 connects together the sections 3 and 4.

Each injector device comprises a box-like casing 9 forming an air chamber 10. One of the connected tube sections is screwed into one wall of said casing, as at 10', and said wall is formed with a conical, nozzle-like projection 11 alining with the connected tube sections and formed with a bore 12 forming part of the carrier passage in the tube line. Said projection tapers toward the discharge end of the tube line. A threaded aperture 13, alining with projection 11, is formed in the opposite wall of the casing and has a threaded sleeve 14 screwed into it. Said sleeve is formed at its inner end with an annular, conical, internal surface 15 which telescopes over the nozzle 11 and cooperates with the conical surface of the latter to define an annular injector port 16 leading from the chamber 10 obliquely into the tube line. The opposed port-forming surfaces are of material length and correspondingly tapered, and their taper makes quite a low angle with the tube line in order to give positive longitudinal direction to the air injection. The sleeve receives and rotatably fits an end of one of the connected tube sections and is formed with a bore forming part of the carrier passage. By turning the sleeve the space between the tapering port walls may be varied to change the size of the port, and to entirely close the port when required.

The injector devices 7 and 8 are supplied with air which is withdrawn from the dispatch tube line at intermediate points suitably spaced along the line. For supplying the injector 7 a by-pass pipe 17 leads from the tube line at a point between the sending terminal 5 and said injector and preferably near the latter. At its opposite end said by-pass pipe is connected to casing 9 and opens into the air chamber 10. A similar by-pass pipe 18 leads from the tube line at a point between the two injectors and preferably near injector 8. Its opposite end is connected to the casing of said injector and opens into the air chamber thereof. Connected into each by-pass pipe is an air compressor 19 which is driven by an electric motor 20. Each of the pipes 17 and 18 is connected to the tube line through the medium of a casing 1ª which surrounds the tube and defines an annular chamber 1ᵇ. The tube has ports 1ᶜ equally spaced around it and opening into chamber 1ᵇ, and said chamber opens into the connected pipe 17 or 18. Thereby, the suction is evenly distributed around the tube.

At the sending end of the tube line is an electric switch 21. This switch comprises two normally separated spring contact fingers, one of which carries an insulated cam-like projection 22 which projects into the dispatch tube in the path of the carriers. A timer, diagrammatically indicated at 23, is connected into a circuit 24 controlled by the switch 21 and is supplied with current from the line wires 25. The timer controls a circuit 26 into which a motor controller 27 is connected, and the latter opens and closes a circuit 28 for the motors 20.

In preparing the tube line for service the sleeve 14 of each injector is so adjusted that the cross sectional area of the injector port 16 is small in comparison with the area of the ports 1ᶜ and in comparison with the cross sectional area or capacity of the portion of the by-pass 17 or 18 leading from said ports 1ᶜ to the compressor 19. This adjustment produces a capacity differential between the intake and the outlet of the compressor. The compressor is able to take in air freely and at low velocity through an unrestricted inlet and compress the air at the restricted injector port for forcible injection into the carrier passage of the dispatch tube. The force of the forward injection and the suction created thereby materially exceeds the suction force at the ports 1c and ensures positive propulsion of the carriers past said ports.

When a carrier is inserted into the sending terminal 5 it strikes the switch cam 22, closes the switch and causes the timer to operate. The timer closes the motor controller circuit 26 and holds it closed for the desired length of time; the controller holds the motor circuit 28 closed, and the motors drive the compressors 19. Air is thereby withdrawn by suction through the pipes 17 and 18, compressed into the air chambers 10 at a high pressure and discharged back into the tube line at a high speed and with great force. The suction created by the forward injection of air into the tube line and the suction from the tube line draws an inserted carrier rapidly inward from the sending terminal. A strong impulse is received by the carrier from the first air injection and this impulse assisted by suction farther along the line propels the carrier rapidly to the second injector where it receives another impulse which boosts it along rapidly to the discharge terminal 6. A carrier is thereby propelled along the tube line more rapidly and positively and with less expenditure of power than is customarily required. Only a small volume of air need be withdrawn through the pipes 17 and 18 for the injectors. Owing to the force of the injection and its distribution along the line, and the cooperation of the suction therewith, the displacement of a large volume of air is rendered unnecessary. The timer, when it has operated for a predetermined time, opens the circuit 26 and the motor controller 27 then opens the motor circuit 28 to stop the motors.

The injectors are independently adjustable to vary the injection at the different points along the line according to the requirements. Also, if required, the injection and suction at the different points may be further varied by using compressors of different capacities or by driving the compressors at different speeds.

It will be observed that the annular series of ports 1c form virtually an annular port which is in communication with the annular suction chamber 1b surrounding the tube line. The advantage in this arrangement is that the suction point in the tube line shall be located as close as possible to the injector and thus insure the carrier being impelled by the suction into the sphere of influence of the injector, and a further advantage is that the entire suction power shall be exerted on the carrier until it reaches a point where it is about to be delivered to the injector, which would not be the case if the ports 1c were strung along the dispatch tube.

What I claim is:

1. A pneumatic dispatch tube apparatus comprising a pressure suction dispatch tube line connecting a carrier sending station and a remote carrier discharge station, an injector device at an intermediate point on the carrier passage of said line between said stations and having an annular restricted injector port opening into the carrier passage of the line and directed therealong toward the discharge station and from the sending station; a by-pass inlet at an intermediate point in the line between said injector and said sending station; an air by-pass conduit leading from said inlet and having a delivery connection with the injector device, said conduit having an annular air chamber surrounding the tube line in connection with the annular injector port in said tube, said conduit being of materially greater capacity than the injector port, and the by-pass air inlet being of greater capacity than the annular injector port leading into the carrier passage from said annular chamber; and an air compressor connected to said conduit to draw air therethrough from the tube line and compress it in said annular chamber for forcible injection and positive direction by the walls of said port toward the discharge station, the inlet into the by-pass conduit, and the injector port being so relatively proportioned that the compression of air in the said annular chamber will be of such a degree that the air passing through the injector port into the tube passage will move at a velocity sufficient to produce suction in the carrier passage at the carrier approaching side of the injector port to counteract the suction in the tube between the injector port and the by-pass inlet, thereby to prevent movement of air in the carrier passage from the injector port to the by-pass inlet, and ensure that air drawn into the by-pass conduit will be taken from the tube at the carrier approaching side of the by-pass inlet.

2. A pneumatic dispatch tube apparatus comprising a dispatch tube line connecting a carrier sending station and a remote carrier discharge station, an injector device at an intermediate point on said line between said stations and having an annular restricted injector port opening into the line and directed therealong toward the discharge station and from the sending station; a by-pass inlet at an intermediate point in the line between said injector and said sending station; an air by-pass conduit leading from said inlet and having a delivery connection with the injector device, said conduit having an annular air chamber surrounding the tube line in connection with the injector port in said tube, said conduit being of materially greater capacity than the injector port, and the by-pass air inlet being of greater capacity than the annular injector port; and an air compressor connected to said conduit to draw air therethrough from the tube line and compress it in said annular chamber for forcible injection and positive direction by the walls of said port toward the discharge station, the inlet into the by-pass conduit, and the injector port being so relatively proportioned that the compression of the air in the said annular chamber will be of such a degree that the air passing through the injector port into the tube passage will produce suction in the carrier passage at the carrier approaching side of the injector port to counteract the suction in the tube between the injector port and the by-pass inlet, thereby to prevent movement of air in the carrier passage from the injector port to the by-pass inlet and ensure that air drawn into the by-pass conduit will be taken from the tube at the carrier approaching side of the by-pass inlet.

3. A pneumatic dispatch tube apparatus comprising a dispatch tube line connecting a carrier sending station and a remote carrier discharge station and having atmospheric connections at both said stations, an injector device at an intermediate point on said line between said stations and having a restricted injector port opening into the line and directed therealong toward the discharge station and from the sending station; a by-pass inlet at an intermediate point in the line between said injector and said sending station; an air by-pass conduit leading from said inlet and having a delivery connection with the injector device, said conduit having an air connection with the injector port in said tube, said conduit being of materially greater capacity than the injector port, and the by-pass air inlet being of greater capacity than the injector port; and an air compressor connected to said conduit to draw air therethrough from the tube line and compress it for forcible injection and positive direction by the walls of said port toward a discharge station, the inlet into the by-pass conduit, and the injector port being so relatively proportioned that the compression of the air by said compressor will be of such a degree that the air passing through the injector port into the tube passage will produce suction in the carrier passage at the carrier approaching side of the injector port to counteract the suction in the tube between the injector port and the by-pass inlet, thereby to prevent movement of air in the carrier passage from the injector port to the by-pass inlet and ensure that air drawn into the by-pass conduit will be taken from the tube at the carrier approaching side of the by-pass inlet.

4. A pneumatic dispatch tube apparatus comprising a dispatch tube line connecting a carrier sending station and a remote carrier discharge station, an injector device at an intermediate point on said line between said stations and having a restricted injector port opening into the line and directed therealong toward the discharge station and from the sending station; a by-pass inlet at an intermediate point in the line between said injector and said sending station; an air by-pass conduit leading from said inlet and having a delivery connection with the injector device, said conduit having an air connection with the injector port in said tube, said conduit being of materially greater capacity than the injector port, and the by-pass air inlet being of greater capacity than the injector port; and an air compressor connected to said conduit to draw air therethrough from the tube line and compress it for forcible injection and positive direction by the walls of said port toward a discharge station, the inlet into the by-pass conduit, and the injector port, being so relatively proportioned that the compression of the air by said compressor will be of such a degree that the air passing through the injector port into the tube passage will produce suction in the carrier passage at the carrier approaching side of the injector port to counteract the suction in the tube between the injector port and the by-pass inlet, thereby to prevent movement of air in the carrier passage from the injector port to the by-pass inlet and ensure that air drawn into the by-pass conduit will be taken from the tube at the carrier approaching side of the by-pass inlet.

5. A pneumatic dispatch tube apparatus comprising a dispatch tube line connecting a carrier sending station and a remote carrier discharge station, an injector device at an intermediate point on said line between said stations and having a restricted injector port opening into the line and directed therealong toward the discharge station and from the sending station; a by-pass inlet at an intermediate point in the line between said injector and said sending station; an air by-pass conduit leading from said inlet and having a delivery connection with the injector device, said conduit having an air connection with the injector port in said tube, said conduit being of materially greater capacity than the injector port, and the by-pass air inlet being of greater capacity than the injector port; and an air compressor connected to said conduit to draw air therethrough from the tube line and compress it for forcible injection and positive direction by the walls of said port toward a discharge station, the inlet into the by-pass conduit, and the injector port, being so relatively proportioned that the compressor will withdraw at a low velocity a certain volume of low pressure air in a certain time interval and will force that same volume of air in the same time interval into the tube at high pressure and high velocity.

6. A pneumatic dispatch tube apparatus comprising a dispatch tube line connecting a carrier sending station and a remote carrier discharge station, an injector device at an intermediate point on said line between said stations and having a restricted injector port opening into the line and directed therealong toward the discharge station and from the sending station; adjustable means to vary the size of said injector port; a by-pass inlet at an intermediate point in the line between said injector and said sending station; an air by-pass conduit leading from said inlet and having a delivery connection with the injector device, said conduit having an air connection with the injector port in said tube, said conduit being of materially greater capacity than the injector port, and the by-pass air inlet being of greater capacity than the injector port; and an air compressor connected to said conduit to draw air therethrough from the tube line and compress it for forcible injection and positive direction by the walls of said port toward a discharge station, the inlet into the by-pass conduit, and the injector port, being so relatively proportioned that the compressor will withdraw at a low velocity a certain volume of low pressure air in a certain time interval and will force that same volume of air in the same time interval into the tube at high pressure and high velocity.

JOHN T. NEEDHAM.